June 6, 1944.  H. W. GOFF  2,350,887
METHOD OF MANUFACTURING PARTS FOR ELECTRICAL APPARATUS
Filed Nov. 28, 1941    3 Sheets-Sheet 1
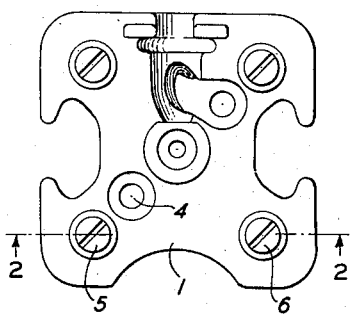
FIG. 1
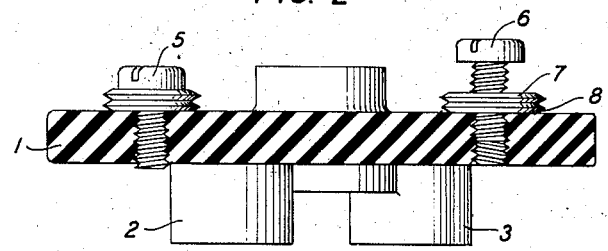
FIG. 2
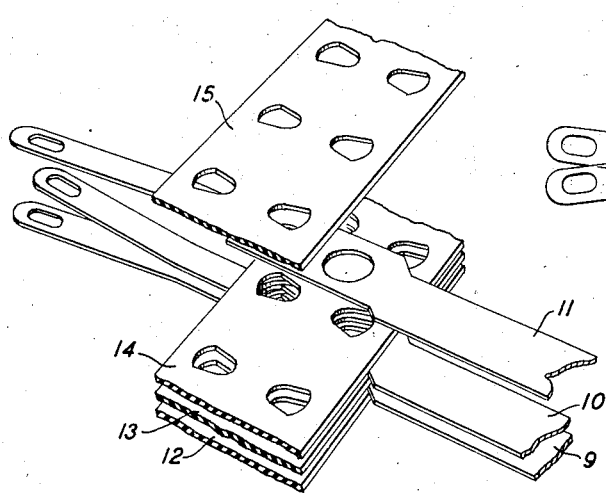
FIG. 3
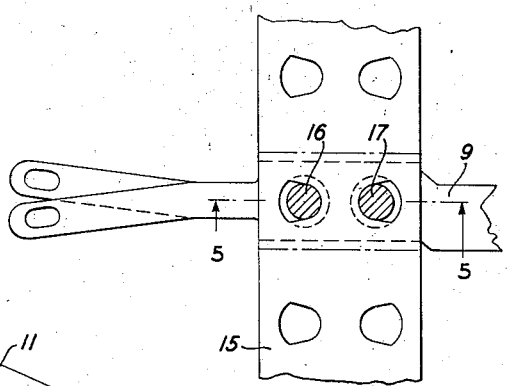
FIG. 4
FIG. 5
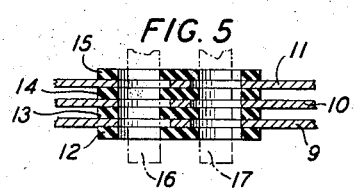
FIG. 6
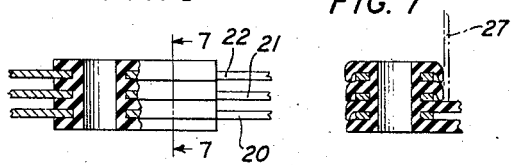
FIG. 7
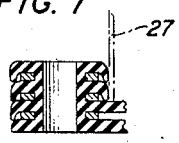
FIG. 8
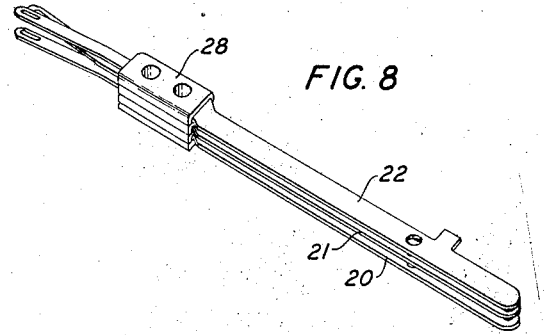
FIG. 9
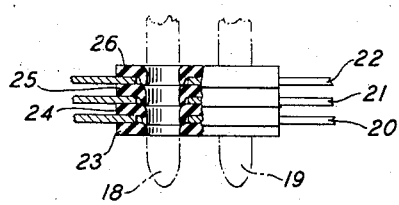
INVENTOR
H. W. GOFF
BY John A Hall
ATTORNEY June 6, 1944.    H. W. GOFF    2,350,887
METHOD OF MANUFACTURING PARTS FOR ELECTRICAL APPARATUS
Filed Nov. 28, 1941    3 Sheets-Sheet 2

INVENTOR
H. W. GOFF
BY John A. Hall
ATTORNEY

June 6, 1944. H. W. GOFF 2,350,887
METHOD OF MANUFACTURING PARTS FOR ELECTRICAL APPARATUS
Filed Nov. 28, 1941 3 Sheets-Sheet 3

INVENTOR
H. W. GOFF
BY John A. Hall
ATTORNEY

Patented June 6, 1944

2,350,887

UNITED STATES PATENT OFFICE 2,350,887

METHOD OF MANUFACTURING PARTS FOR ELECTRICAL APPARATUS

Harold W. Goff, Manhasset, N. Y., assignor to Bell Telephone Laboratories, Incorporated, New York, N. Y., a corporation of New York Application November 28, 1941, Serial No. 420,763

3 Claims. (Cl. 154—2)

This invention relates to connectors for electrical devices and particularly to binding posts, terminals and other small sized conducting parts mounted on an insulating base.

The object of the invention is to provide an economical method of manufacture of parts for electrical apparatus comprising metallic and conducting pieces embedded in thermoplastic bases. Heretofore such parts have been made either by nut and bolt assembly, by riveting or by moulding operations. The parts made by moulding inserts of various shapes and sizes are generally preferable but the operations required in the process of manufacture are complicated, difficult and expensive. A straight moulding operation whereby a base portion of thermoplastic material only is produced is relatively inexpensive. The present invention has for one of its objects to secure the economy of such an operation while at the same time producing an article having the advantages of the completely moulded part. Accordingly, the metallic pieces and inserts are embedded in the thermoplastic base after it has been formed by the application of pressure and localized heating applied by conduction through the metallic piece.

In accordance with one form of the invention the thermoplastic base and the metallic piece are pressed together and the metallic piece is heated by contact with a hot part of the press whereby the thermoplastic is heated and softened locally so that the metallic piece is embedded therein. By using presses of proper design the metallic piece may be accurately placed so that the finished part after cooling is accurately dimensioned.

In accordance with another form of the invention a number of metallic and insulating pieces are assembled and then formed into a unitary structure by localized heating of the thermoplastic material by a hot tool such as a pin to pierce through apertures in the parts or a knife to form edges.

Other features will appear in the following description.

The drawings consist of three sheets having twenty-three figures as follows:

Fig. 1 is a plan view of a terminal connecting block;

Fig. 2 is a side view, partly in section of the same;

Fig. 3 is a perspective view, partly exploded of an assembly of contact springs and insulating strips as placed in a jig prior to the heat treatment of thermoplastic composition;

Fig. 4 is a plan view of the same;

Fig. 5 is a cross section, taken along the line 5—5 of Fig. 4;

Fig. 6 is a cross section, similar to that of Fig. 5, showing the formation of thermoplastic material about the metallic elements;

Fig. 7 is a cross-sectional view of the same taken along line 7—7 of Fig. 6;

Fig. 8 is a perspective view of a contact spring assembly produced by the method illustrated by Figs. 6 and 7;

Fig. 9 is a view partly in cross section showing an alternative method of forming an assembly like that of Fig. 8;

Figure 11:
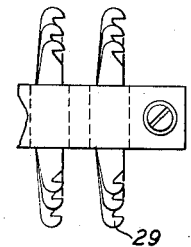
Fig. 11 is a top view of the same.

In Figs. 1 and 2, a piece of thermoplastic material 1 is molded to the desired shape by any well-known method. It is provided with lugs 2 and 3 through which countersunk screw holes such as 4 are formed for ready attachment to a wooden surface. No metal parts are provided in the molded article. The base part 1 may then be placed on any convenient supporting surface and the screws 5 and 6 pressed into the thermoplastic by applying heat thereto. The hot screws 5 and 6 soften the thermoplastic material locally and after cooling may be screwed into and out of the threaded holes so formed. A pair of metallic washers 7 and 8 may be placed under each screw head so that electrical connections such as between a wire and a cord tip may be secured by driving the screw home. The amount of pressure and the degree of heat applied to the screw to mold in into the thermoplastic base 1 are a matter of engineering concern, revolving about several factors such as the speed of the operation desired, the tolerance allowed in the appearance of the finished article and so forth.

In Figs. 3, 4, and 5, a method of assembly of contact springs is shown. Portions of metallic springs 9, 10, and 11 are shown interleaved with punched strips of hard insulating material 12, 13, 14, and 15. When a spring pile-up is assembled and held stationary in a jig, small plugs of thermoplastic material are inserted in the holes formed by the registered punched out portions in the springs and insulating material. Heated pins such as the pins 16 and 17 indicated in outline in Fig. 5 are then pressed through these holes and the thermoplastic material is then firmly squeezed into the interstices between such hot pins and the edges of the metallic springs and insulating strips. This method is especially appropriate where a strip of springs is to be formed, as for instance a set of jack springs for a telephone switchboard where either ten or twenty such spring combinations are used.

An alternative method is shown in Figs. 6 to 9, inclusive, where a unitary spring combination for use in relay construction is to be produced. In this case strips of thermoplastic material rather than the hard insulation used previously is employed. In this case the strips of thermoplastic material are not punched, or if punched then only small parts are punched out. When the parts are secured in a jig, heated pins 18 and 19 are pressed through the registered holes of the metallic springs 20, 21, and 22 which will turn down the edges of the thermoplastic material pieces 24, 25, and 26 as shown in Fig. 9, or if enough material is present will completely fill the interstices between the pins 18 and 19 and the springs 20 to 22 as indicated in Figs. 6 and 7. The outer edges of the thermoplastic material are then turned down and sealed together by a heated knife 27 as indicated in Fig. 7. Multiple units are made by assembling strips of thermoplastic and the spring assemblies as indicated in Figs. 3 and 4 and then severing such multiple units by passing a hot knife downwardly between the spring assemblies, thus deforming the edges of the thermoplastic so that it covers the edges of the metallic pieces and seals the whole into a permanently assembled unit. The completed assembly is shown in Fig. 8, where the three contact springs 20, 21, and 22 are shown firmly assembled in a unitary spring combination by the formed thermoplastic part generally indicated by the numeral 28.

Figure 10:
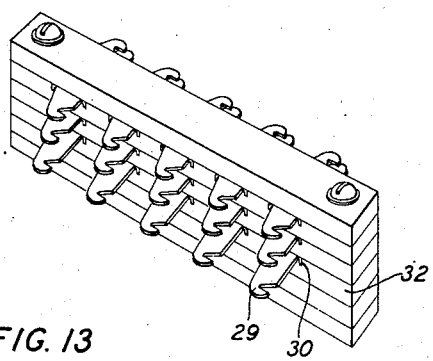
Fig. 10 is a perspective view of a terminal block.
Figure 12:
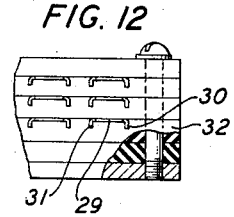
Fig. 12 is a side view of the same, partly in section.
Figure 13:
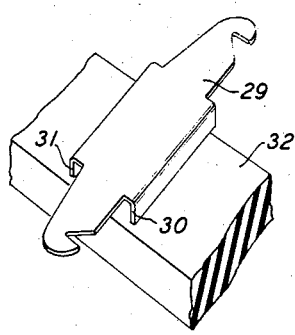
Fig. 13 is an enlarged and fragmentary view of a portion of the device of Fig. 13 showing the relation of the parts before the metallic member is pressed into the thermoplastic.
Figure 14:
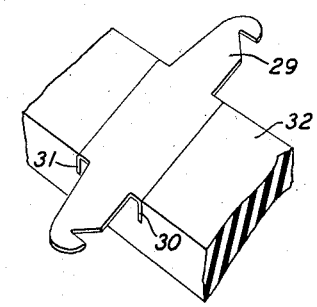
Fig. 14 is a similar view after the metallic member has been pressed into the thermoplastic.

Figs. 10 to 14 show the application of the present invention to the formation of a terminal block. Essentially a metallic part with bent-down portions 30 and 31 is bodily pressed into the surface of a block 32 of thermoplastic material. The block 32 may be held on a bed plate of a press and a heated upper member of the press applied to the upper surface of the part 29. Heat transferred to the part 29 by conduction will cause the local softening of the thermoplastic material until the part 29 is embedded in the block 32 as indicated in Fig. 14, as well as in Figs. 10 and 12. When cooled the metallic part 29 will be firmly held in the thermoplastic block 32. Through this method a plurality of such metallic parts may be assembled to form a terminal block as shown in Figs. 10 to 12.

Figure 15:
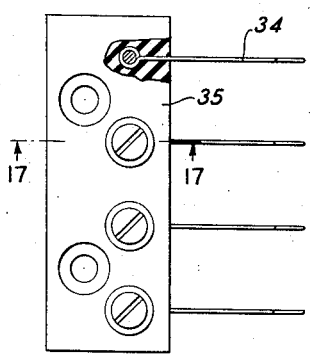
Fig. 15 is a top view partly in section of a terminal block in which a screw and a spiral of wire forming a seat for the screw threads are embedded in a block of thermoplastic.
Figure 17:
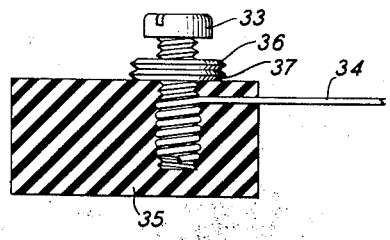
Fig. 17 is an enlarged side view in section thereof, taken along the line 17—17 of Fig. 16.
Figure 16:
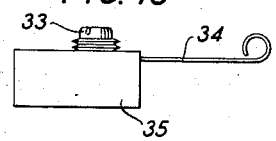
Fig. 16 is a side view thereof.

Another application of the invention is shown in Figs. 15, 16, and 17. Here a screw 33 with a wire 34 wrapped in a spiral about the threads thereof is embedded in a block of thermoplastic material 35. Through heat and pressure applied to the screw head 33 the screw and the wire 34 are both pressed into the thermoplastic and when properly cooled will form a terminal block shown in these figures. Permanent connections may be soldered to the projecting end of the wire 34 and temporary connections may be secured under the screw head 33 with the aid of the metallic washers 36 and 37. The spiral of the wire 34 forms a threaded seat for the screw 33 and a good conductive path will be afforded between the screw 33 and the wire 34.

Figure 18:
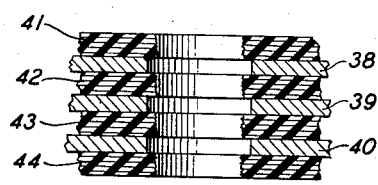
Fig. 18 is a sectional view of an assembly of metallic parts and insulating pieces ready for binding by means of thermoplastic material.
Figure 19:
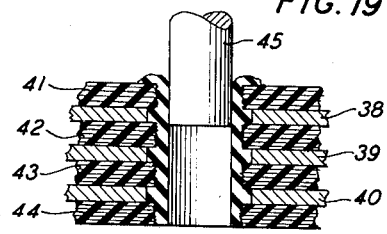
Fig. 19 is another view of the same, showing a press member being withdrawn after the operation of pressing thermoplastic material into the assembly of Fig. 18.

Figs. 18 and 19 illustrate in more detail a variation of the invention shown in Figs. 3 to 5. Here the metallic parts 38, 39, and 40 are placed between insulators 41 to 44. This insulating material may be that type generally known as phenol fiber which has the characteristic of affording very rough edges where a punching is made. When these parts are properly registered as by being placed in a jig a plug of thermoplastic material is inserted in the hole and squeezed into the interstices between the metallic parts, the phenol fiber insulation and a heated plunger 45. Fig. 19 shows the plunger being withdrawn and illustrates the manner in which the thermoplastic forms a bond between the various parts. Any excess of thermoplastic material squeezed out at the top may be levelled off after cooling in any appropriate manner.

Figure 20:
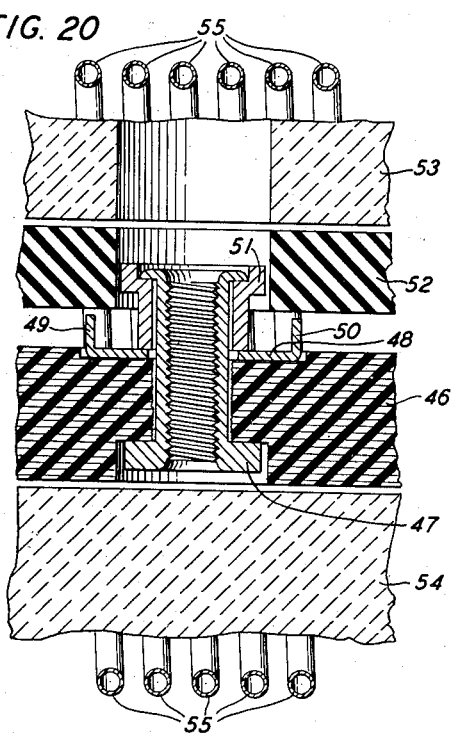
Fig. 20 is a cross-sectional view showing an assembly of metallic parts, insulation and thermoplastic before the hot pressing operation with the various parts in position just prior to the pressing operation.
Figure 21:
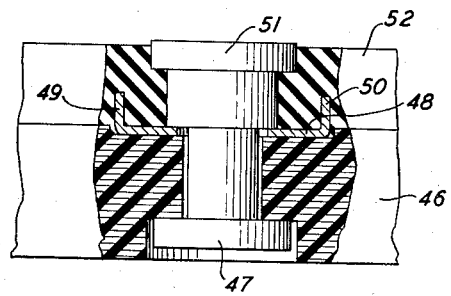
Fig. 21 is a similar view of the completed assembly.

Figs. 20 and 21 show another form of the invention in which a terminal is secured to a block of hard insulation instead of thermoplastic. A block of hard insulation 46 is molded to accommodate a hollow rivet or eyelet 47. A metallic part 48 with turned-up edges 49 and 50 and which may extend beyond the block of insulation to act as a terminal in much the same way as the part 29 in Figs. 13 and 14 is slipped over the hollow rivet 47. Then a metallic collar 51 is slipped over the end of the hollow rivet 47 and the metal parts forced under pressure into the form indicated whereby the rivet is spun over and the parts secured together (the internal threading of the rivet 47 may be done at any time).

Thereafter a piece of thermoplastic material 52 is placed over the metal assembly and by the parts 53 and 54 representing the jaws of a press, is gently pressed down on the metallic edges 49 and 50. The metal assembly may be heated in any convenient manner so that the thermoplastic will be softened locally through contact with the hot metal and will flow around the parts so that when cooled it will appear as indicated in Fig. 21.

One convenient method of heating the metal assembly is by high frequency current. The tube 55 represents a coil into which the assembly is placed during the pressing operation. High frequency current flow through this coil and in the well-known manner causes the metal assembly to heat up sufficiently for this operation. This method is particularly convenient because by the application of the current for a timed interval the heating of the parts can be controlled exactly.

It should be noted that the jaws 53 and 54 are nonconducting so as not to be heated by the current in the coil 55. These jaws may be of any convenient and suitable material as a ceramic by way of example.

Figure 22:
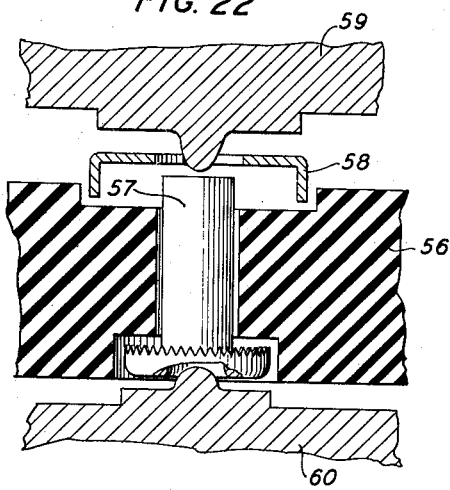
Fig. 22 is a cross-sectional view of a pair of metallic parts about to be secured to a piece of thermoplastic material by a pressing operation.
Figure 23:
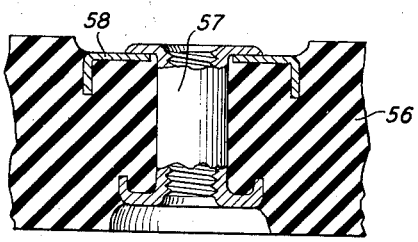
Fig. 23 is a cross-sectional view of the completed assembly.

Another form of the invention is shown in Figs. 22 and 23 where a contact spring and eyelet are secured to a block of thermoplastic material. Here the thermoplastic 56 may be appropriately drilled or molded to provide space for the eyelet 57 and the contact spring 58. Before the pressing operation the parts may be placed as shown in Fig. 22. Heated jaws 59 and 60 of a press are then applied to the contact spring 58 and the lower head of the eyelet 57 and will force the turned-down points of the contact spring 58 and the turned-up jagged edge of the lower head of the eyelet into the thermoplastic by the local heating thereof by conduction of heat from the heated press jaws. At the same time and during this operation the upper end of the eyelet may be spun over as indicated in Fig. 23. The eyelet may later be threaded to accommodate a screw. Heat may be applied to the jaws of the press in any appropriate manner. The metal parts to be embedded in the thermoplastic may be heated by conduction from the jaws of the press or they may be heated by passing through a coil energized by high frequency current. Any appropriate assembly line methods may be employed by which the metal parts are embedded in or surrounded by thermoplastic material locally softened by heat applied by the metal parts.

What is claimed is:

1. The method of manufacturing parts for electrical apparatus consisting of assembling a plurality of interposed alternating metallic and thermoplastic pieces, aligning the edges of said metallic pieces, said metallic pieces lying inwardly of said thermoplastic pieces, and then applying a heated forming tool to said projecting thermoplastic pieces whereby such edges are trimmed, deformed and united locally to seal in and protect the edges of said metallic pieces.

2. The method of manufacturing parts for electrical apparatus consisting of assembling a plurality of alternating metallic and thermoplastic pieces having aligned apertures, the apertures of the thermoplastic pieces being smaller than the apertures of the metallic pieces, and then sealing the assembly in permanent form by pressing a heated piercing tool, of a size intermediate the size of the apertures in said thermoplastic pieces and said metallic pieces, through said aligned apertures, whereby the edges of the thermoplastic pieces are deformed and united locally to cover the edges of the said metallic pieces.

3. The method of manufacturing parts for electrical apparatus consisting of assembling a plurality of stacks of alternating metallic and thermoplastic pieces, the thermoplastic pieces being in long strips sufficient to form a plurality of final parts, the edges of the said metallic pieces being aligned and the stacks thereof being separated by a distance greater than the dimensions of a forming tool, and then pressing a heated forming tool through the thermoplastic pieces between the assembled conducting pieces whereby the thermoplastic pieces are severed between stacks, deformed and united locally to cover the edges of the said metallic pieces and to form a plurality of said parts.

HAROLD W. GOFF.